United States Patent [19]

George et al.

[11] Patent Number: 4,868,242

[45] Date of Patent: Sep. 19, 1989

[54] COMPOSITION COMPRISING A BLEND OF AN ETHYLENE-CARBON MONOXIDE INTERPOLYMER AND A MALEATED, PARTIALLY HYDROGENATED BLOCK COPOLYMER

[75] Inventors: Eric R. George; William P. Gergen, both of Houston, Tex.

[73] Assignee: Shell Oil Company, Houston, Tex.

[21] Appl. No.: 203,975

[22] Filed: Jun. 8, 1988

[51] Int. Cl.[4] .................... C08L 23/00; C08L 51/06; C08L 53/02; C08L 51/04
[52] U.S. Cl. ........................................ 525/64; 525/92; 525/185
[58] Field of Search ............... 525/92, 185, 64, 66, 525/93, 95, 98

[56] References Cited

U.S. PATENT DOCUMENTS

| | | | |
|---|---|---|---|
| 2,495,286 | 1/1950 | Brubaker | 260/63 |
| 3,251,905 | 5/1966 | Zelinski | 260/879 |
| 3,390,207 | 6/1968 | Moss et al. | 260/879 |
| 3,598,887 | 8/1971 | Darcy et al. | 260/879 |
| 3,780,140 | 12/1973 | Hammer | 260/884 |
| 3,964,412 | 9/1972 | Nozaki | 260/63 |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,427,828 | 1/1984 | Bergenrother et al. | 525/66 |
| 4,578,429 | 3/1986 | Gergen et al. | 525/291 |
| 4,657,970 | 4/1987 | Shiraki et al. | 525/92 |
| 4,659,970 | 4/1987 | Melocik . | |
| 4,659,971 | 4/1987 | Suzuki et al. . | |
| 4,670,173 | 6/1987 | Hayashi et al. | 252/51.5 A |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 5/1987 | European Pat. Off. . |
| 1081304 | 8/1967 | United Kingdom . |

*Primary Examiner*—Allan M. Lieberman
*Attorney, Agent, or Firm*—Dean F. Vance

[57] ABSTRACT

Blends of a linear alternating polymer of carbon monoxide and at least one ethylenically unsaturated hydrocarbon with specified amounts of a maleated, partially hydrogenated block copolymers demonstrate improved properties of impact strength and flex modulus.

7 Claims, 1 Drawing Sheet

COMPOSITION COMPRISING A BLEND OF AN ETHYLENE-CARBON MONOXIDE INTERPOLYMER AND A MALEATED, PARTIALLY HYDROGENATED BLOCK COPOLYMER

FIELD OF THE INVENTION

This invention relates to an improved polymer blend comprising predominantly a linear alternating polymer of carbon monoxide and at least one ethylenically unsaturated hydrocarbon. More particularly, the invention relates to the provision of blends of the linear alternating polymer with specified amounts of certain maleated, partially hydrogenated block copolymers.

BACKGROUND OF THE INVENTION

The class of polymers of carbon monoxide and olefin(s) has been known for some time. Brubaker, U.S. Pat. No. 2,495,286 produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the reaction to produce linear alternating polymers by the use of arylphosphine complexes of palladium moieties and certain inert solvents. See, for example, U.S. Pat. No. 3,944,412.

More recently, the class of linear alternating polymers of carbon monoxide and at least one ethylenically unsaturated hydrocarbon has become of greater interest in part because of the greater availability of the polymers. These polymers, often referred to as polyketones or polyketone polymers, have been shown to be of the repeating formula $-CO-(A)-$ wherein A is the moiety of ethylenically unsaturated hydrocarbon polymerized through the ethylenic unsaturation. For example, when the hydrocarbon is ethylene, the polymer is represented by the repeating formula $-CO-(-CH_2-CH_2-)-$. The general process for the more recent production of the polymers is illustrated by a number of published European Patent Applications including 121,965 and 181,014. The process typically involves a catalyst composition formed from a compound of palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for the food and drink industry and internal and external parts for automotive applications which are produced by processing the polyketone polymers according to known methods. For some particular applications it has been found desirable to have properties for a polymeric composition which are somewhat different from those of the polyketone polymer. It would be of advantage to retain the more desirable properties of the polyketone polymer and yet improve other properties. These advantages are often obtained through the provision of a polymer blend.

SUMMARY OF THE INVENTION

The present invention relates to polymer blends of linear alternating polymer of carbon monoxide and at least one ethylenically unsaturated hydrocarbon. More particularly, according to the invention, there are provided blends of the linear alternating polymer and specified amounts of a maleated, partially hydrogenated block copolymer. Such blends exhibit an increase in impact strength and in modulus of elasticity with increasing amounts of the block copolymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons are styrene, m-methylstyrene, p-ethylstyrene and p-methylstyrene. Preferred polyketone polymers are copolymers of carbon monoxide and ethylene or are terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon and the polymer will contain substantially one moiety of carbon monoxide for each moiety of hydrocarbon. When terpolymers of carbon monoxide, ethylene and a second hydrocarbon are employed in the blends of the invention, there will be at least about 2 units incorporating a moiety of ethylene for each unit incorporating a moiety of the second hydrocarbon, preferably from abut 10 units to about 100 units incorporating a moiety of ethylene for each unit incorporating a moiety of the second hydrocarbon. The polymer chain is therefore illustrated by the formula

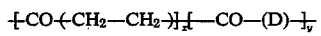

wherein D is the moiety of the second hydrocarbon polymerized through the ethylenic unsaturation. The $-CO-CH_2-CH_2$) units and the $-CO-(D)-$ units are found randomly throughout the polymer chain and the ratio of y:x is no more than about 0.5. In the modification where a copolymer of carbon monoxide and ethylene is employed in the blends of the invention there will be not second hydrocarbon present in the polymer chain and the polymer is represented by the above formula wherein y =0. When y is other than 0, i.e., terpolymers are employed, ratios of y:x from about 0.01 to about 0.1 are preferred. The end groups or "caps" of the polymer chain will depend upon what materials are present during the production of the polymer and whether and how the polymer is purified. The precise physical properties of the polymers will not depend upon the particular end group to any considerable extent so that the polymer is fairly represented by the above formula for the polymeric chain.

Of particular interest are the polyketones of number average molecular weight from about 1,000 to about 200,000, especially those polyketones of molecular weight from about 20,000 to about 90,000 as determined by gel permeation chromatography (GPC). The physical properties will depend in part on the molecular weight of the polymer, whether the polymer is a copolymer or a terpolymer and the relative proportion of the second hydrocarbon present in the case of terpolymers. Typical melting points of such polymers are from about 175° C. to about 300° C., more frequently from about 210° C. to about 270° C. The polymers have a limiting viscosity number (LVN), when measured at 60° C. in m-cresol in a standard capillary viscosity measuring device, of from about 0.5 to about 10, preferably from about 0.8 to about 4.

A method of producing the polymers which is now becoming conventional is to contact the carbon monoxide and hydrocarbon in the presence of a catalyst composition formed from a palladium compound, the anion of a non-hydrohalogenic acid having a pKa below about 6 and a bidentate ligand of phosphorus. The scope of the production of the polyketone is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,2-bit[di(2-methoxyphenyl)-phosphino]propane or 1,3-(diphenylphosphino)propane. Such a process for the production of polyketones is illustrated by copending U.S. patent application Serial No. 930,468, filed Nov. 14, 1986, which is incorporated by reference herein.

Polymerization is conducted in a gas phase or in liquid phase in the presence of an inert diluent such as methanol or ethanol. The reactants are contacted under polymerization conditions in the presence of the catalyst composition by conventional methods such as shaking or stirring in a reaction vessel. Suitable reaction temperatures vary from about 20° C. to about 150° C. with preferred reaction temperatures being from about 50° C. to about 135° C. Typical reaction pressures are from about 1 bar to about 200 bar, more typically from about 10 bar to about 100 bar. Subsequent to reaction, the polymer is recovered as by decantation or filtration. The polymer product may contain residues of the catalyst which are removed, if desired, by treatment of the polymer product with a solvent or a complexing agent which is selective for the residues.

The minor component of the blends of the invention is a modified block copolymer which has been partially hydrogenated and further modified by the grafting of a maleic acid compound onto the block copolymer chain. The term "block copolymer" is used to indicate a thermoplastic elastomer characterized by at least one block of at least predominately polymerized vinyl aromatic hydrocarbon (A blocks) and at least one block of at least predominantly polymerized alkadiene (block B).

The vinyl aromatic hydrocarbon useful as the precursor of the A blocks has a vinyl group, i.e., a >C=CH$_2$ group, attached directly to an aromatic ring and up to 12 carbon atoms inclusive. Preferred vinyl aromatic compounds are styrene and styrene homologs such as those of the formula:

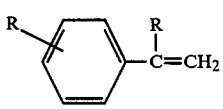

wherein R independently is hydrogen or alkyl of up to 4 carbon atoms inclusive. Illustrative of such compounds are styrene, α-methylstyrene, α-ethylstyrene, p-methystyrene, p-ethylstyrene, m-propylstyrene and α,4-dimethylstyrene. Styrene and α-methystyrene constitute a preferred class of vinyl aromatic compounds and particularly preferred is styrene.

The A blocks of the block copolymer independently are at least predominantly the polymerized vinyl aromatic compound and preferably are homopolymeric blocks. Alternatively, however, one or more A blocks are blocks wherein some of the monomer of block B is copolymerized with the predominant monomer of block A. Such blocks are termed "tapered" and have at least 85% by mol and preferably at least 93% by mol of the polymerized vinyl aromatic hydrocarbon with any remainder being the conjugated alkadiene of block B. A blocks containing a mixture of vinyl aromatic hydrocarbon monomers are also suitable but less preferred. The average molecular weight of an A block is typically from about 5,000 to about 125,000 while A blocks of an average molecular weight from about 7,000 to about 125,000 are preferred.

Each B block independently is at least predominantly polymerized conjugated alkadiene. The alkadiene useful as the monomer for a B block are conjugated alkadienes of up to 8 carbon atoms inclusive such as those conjugated alkadienes of the formula:

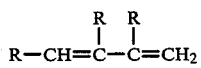

wherein R has the previously stated significance. Illustrative of such alkadienes are butadiene, isoprene, 2,3-dimethylbutadiene, 1,3-octadiene, 1,3-pentadiene and 2-methyl-1,3-hexadiene. Preferred alkadienes are butadiene and isoprene and butadiene is particularly preferred. Each B block is at least predominantly polymerized alkadiene with the B block being at least 85% by mol and preferably at least 93% by mol of polymerized alkadiene with any remainder being the vinyl aromatic hydrocarbon of the A blocks in the case of a tapered block. Homopolymeric blocks as B block are preferred although tapered blocks and blocks of polymerized mixed alkadienes are also satisfactory. Within a polymerized alkadiene block two modes of polymerization are possible and generally observed. In what is termed a 1,4 polymerization, both carbon-carbon double bonds of the conjugated diene are involved in the polymerization such that each carbon atom that forms the double bonds is incorporated within the polymer chain and includes two carbons joined by an ethylenic linkage. In 1,2 polymerization, the polymerization involves only one carbon-carbon double bond of the conjugated alkadiene and only two carbon atoms are added to the polymer chain. The carbon atoms of the conjugated diene that are not incorporated within the polymer chain generally form one or more pendant groups that may contain an ethylenic linkage.

Preferred block copolymers are those wherein from about 25% to about 55% of the units of each B block are the result of 1,2-polymerization. The average molecular weight of a B block is suitably from about 10,000 to about 300,000, preferably from about 30,000 to about 150,000.

Within the block copolymer, the A blocks will total from about 2% by weight to about 55% by weight based on total block copolymer. Contents of A block from about 10% by weight to about 30% by weight, same basis, are preferred. The total molecular weight of the block copolymer will average from about 25,000 to about 350,000, preferably from about 35,000 to about 300,000. These average molecular weights are determined by conventional techniques such as tritium counting methods or osmotic pressure measurements.

The structure of the block copolymer will depend upon the method of polymerization employed to produce the block copolymer. In one modification, the block copolymer is termed linear and is produced by sequential polymerization of the blocks. By way of example in producing a three block copolymer, the vinyl aromatic hydrocarbon of the A block is polymerized through the use of an initiator, preferably an alkyl lithium compound. The conjugated alkadiene of block B is then introduced and subsequently the vinyl aromatic hydrocarbon required for the second A block. Such a block copolymer is characterized as ABA. A two block or diblock polymer is produced by polymerizing an A block using a lithium initiator and subsequently introducing the alkadiene required for the B block. Such a polymer would be characterized as AB. Substantially complete polymerization of each monomer prior to introducing the monomer of the next block will result in the production of homopolymeric blocks. If, prior to the complete polymerization of any one block the monomer of the next block is introduced, tapered blocks will result. Similar sequential polymerization techniques are employed to produce block copolymers characterized as ABABA, ABAB, ABABABA, or even polymers of a higher number of blocks. Production of block copolymers, particularly those of a relatively high number of blocks, is also accomplished by coupling agent to couple or connect growing polymer chains. Use of a difunctional coupling agent such as dihaloalkane will result in higher polymers but use of a coupling agent having a functionality of 3 or more, e.g., silicon tetrahalides or alkyl esters of dicarboxylic acids, will result in polymers which are termed "radial" or "branched" respectively.

These block copolymers are well known in the art and the characterization and production of such polymers are illustrated by U.S. 3,251,905, U.S. 3,390,207, U.S. 3,598,887 and U.S. 4,219,627, which are incorporated by reference herein.

The block copolymers useful as the precursors of the component of the blends of the invention are preferably linear polymers of the following types polystyrene-polybutadiene (SB), polystyrene-polyisoprene (SI), polystyrene-polybutadiene-polystyrene (SBS), polystyrene-polyisoprene-polystyrene (SIS), poly(α-methylstyrene)-polybutadiene-poly(α-methylstyrene), and poly(α-methylstyrene-polyisoprene-poly(α-methylstyrene). Block copolymers of the SBS type are particularly preferred. These block copolymers are now conventional and a number are commercially available and marketed by Shell Chemical Company as KRATON®. Thermoplastic Rubber.

To produce the components of the blends of the invention, the block copolymers are partially hydrogenated and then modified further by reaction with a maleic acid compound. The hydrogenation of block copolymers is also well known in the art and includes catalytic hydrogenation in the presence of Raney Nickel or elemental noble metal in finely divided form including platinum or palladium. Such hydrogenation typically results in hydrogenation of most if not all of the unsaturation of the aromatic rings in the A endblocks as well as the ethylenic unsaturation of aliphatic B block. In the production of the components of the blends of the invention, however, a partial hydrogenation is employed which serves to hydrogenate most of the ethylenic unsaturation of the aliphatic B block while not hydrogenating the unsaturation of the aromatic rings of the A blocks. The process of hydrogenation is illustrated by the disclosures of U.S. 3,113,986 and U.S. 4,226,952, which are incorporated by reference herein. Preferred partially hydrogenated block copolymers are those wherein no more than 25% and preferably no more than 5% of the aromatic unsaturation has been hydrogenated, and wherein the residual unsaturation of the mid-blocks is from about 0.5% to about 20% of the unsaturation prior to hydrogenation.

The partially hydrogenated block copolymer is often identified by the structure of the block copolymer precursor and the "apparent" structure of the aliphatic block. Thus, partial hydrogenation of an SBS block polymer will result in a polymer having a hydrogenated mid-block which is apparently polyethylene in the case of a mid-block unit produced by 1,4-polymerization and ethylene/butylene copolymer in the case of a mid-block unit produced with a high production of 1,2-polymerization. These are indicated by SES and SEBS respectively. A corresponding diblock polymer would be termed SE or SEB. The polymer produced by partial hydrogenation of a SIS block copolymer of a high degree of 1,4 structure in the mid-block is termed, upon hydrogenation, a SEPS polymer because of the similarity of the mid-block to an ethylene/propylene copolymer.

To produce the maleated, partially hydrogenated block copolymers preferred as components of the blends of the invention, partially hydrogenated block copolymers of the SES/SEBS type are preferred wherein units of the mid-block are from about 45% to about 65% of the E type mid-block with the remainder being of the EB type. The partially hydrogenated block copolymers of these types are also well known in the art with a number being commercial, for example, certain of the partially hydrogenated block copolymers marketed by Shell Chemical Company as KRATON®G Thermoplastic Rubber.

The maleated, partially hydrogenated block copolymer employed as a component of the blends of the invention is an adduct of the partially hydrogenated block copolymer and a maleic acid compound. The maleated materials are illustratively produced by addition of a hydrogen atom located on a carbon atoms allylic to residual mid-block unsaturation of the partially hydrogenated block copolymer to the carbon-carbon double bond of the maleic acid compound together with the formation of a carbon-carbon bond between the maleic acid compound and the polymer chain of the partially hydrogenated block copolymer. By way of further illustration, but without wishing to be bound by any particular reaction theory, the production of maleated derivatives takes place according to the reaction scheme which follows, using maleic anhydride as an illustrative maleic acid compound, wherein the wavy lines represent the continuing polymer chain.

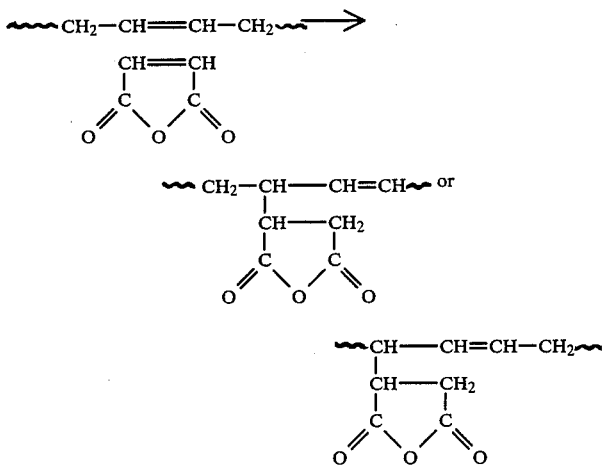

Maleic acid compounds which are suitably employed in the production of the maleated, partially hydrogenated block copolymers are maleic acid, maleic anhydride, mono-alkyl esters of maleic acid wherein the alkyl is alkyl of up to 4 carbons inclusive, the mono-amide of maleic acid and maleic imide. Of these, the use of maleic anhydride is preferred.

The maleated, partially hydrogenated block copolymers are known in the art as is the method of their production. In general, the process for the production of the maleated product is a graft process wherein the maleic acid compound is grafted onto the mid-block of the partially hydrogenated block copolymer chain. In one modification the partially hydrogenated block copolymer and the maleic acid compound are contacted in the presence of a free radical initiator which is preferably a peroxy compound. Contacting customarily takes place at a temperature sufficient to melt the reactants and decompose the free radical initiator, for example, a temperature from about 75° C. to about 450° C., more often from about 200° C. to about 300° C. Such reactions are conducted without solvent and often in an extruder which serves to melt and mix the reactants and to heat the mixture to the desired elevated temperature. In certain alternate modifications, the partially hydrogenated block copolymer and the maleic acid compound are contacted in solution in a solvent such as benzene, toluene, or xylene and reacted in the absence of a free radical initiator at elevated temperatures on the order of from about 150° C. to about 200° C. Often, a free radical inhibitor is employed in these latter modifications to reduce gellation.

The extent of maleation of the partially hydrogenated block copolymer is dependent in part on the residual unsaturation of the polymer aliphatic block. In terms of the polymers as described above, sufficient maleic acid compound is reacted with the partially hydrogenated block copolymer to produce a maleated derivative containing from about 0.02% by weight to about 20% by weight, based on total polymer, of the moiety derived from the maleic acid compound grafted onto the polymer aliphatic block. Preferably the maleated polymer will contain from about 0.1% by weight to about 10% by weight, same basis, of the maleic acid compound moiety and most preferably from about 0.2 % by weight to about 5% by weight of the maleic acid compound moiety.

In general, the solvent free, "extruder-type" maleation process is preferred. Disclosures of such processes, now conventional, as well as the maleated products are found in U.S. Pat. Nos. 4,292,414, 4,427,828, 4,628,072, 4,659,970 and 4,657,971. Other processes are disclosed by U.S. Pat. Nos. 4,578,429 and 4,670,173.

Certain of the malenated, partially hydrogenated block copolymers are commercial and are marketed by Shell Chemical Company as KRATON®G Thermoplastic Elastomers. A particularly preferred maleated, partially hydrogenated block copolymer is marketed as KRATON®G 1901X Thermoplastic Rubber and is characterized as a maleated block copolymer of the SES/SEBS type with a maleic acid functionality, as grafted maleic anhydride, of 2% by weight.

The blends of the invention comprise a mixture of a major proportion of the polyketone polymer and a minor proportion of the maleated, partially hydrogenated block copolymer. The amount of the modified block copolymer depends on the impact strength desired and the properties of the polyketone polymer component. Amounts of modified block copolymer between about 0.5 to 40% by weight, based on total blend, should result in some improvement in the impact strength and modulus of elasticity of the polyketone component. Amounts of the modified block copolymer from about 2% by weight to about 20% by weight on the same basis are preferred.

The method of producing the blend of the polyketone polymer and the maleated, partially hydrogenated block copolymer is not critical so long as a uniform blend of the components is produced. The polyketone/modified block copolymer blend is a non-miscible blend with the maleated, partially hydrogenated block copolymer existing as a discrete phase within the polyketone matrix and having a phase size of from about 0.2 microns to about 2 microns, more typically on the order of 0.3-0.4 microns. The blend will therefore not be homogeneous but the distribution of the modified block copolymer throughout the polyketone polymer matrix will be substantially uniform. The method of blending the components are those which are conventional for non-miscible polymer systems. The polymeric materials are blended in a co-rotating twin screw extruder in one modification to produce the blend as an extrudate. In an alternate modification the components are blended in a mixing device which exhibits high shear prior to injection molding.

The blends of the invention may also include conventional additives such as antioxidants, stabilizers, fire resistant materials, reinforcements, mold release agents and colorants which increase the processability of the polymers or modify the properties of the resulting blend. Such additives are added by conventional methods prior to, together with or subsequent to the blending of the polyketone polymer and the maleated, partially hydrogenated block copolymer.

The blends of the invention are characterized by increased modulus of elasticity when compared to the polyketone polymer. The blends are of particular utility where production of articles which require toughness and strength when exposed to reduced temperatures and physical stress. The blends are processed by means of the usual techniques such as extrusion or injection molding into sheets, films, fibers, plates and shaped articles. Illustrative of such applications are the production of both internal and external parts for the transportation and related industries and structural parts for utilization in the construction industry.

The invention is further illustrated by the following Illustrative Embodiments which should not be regarded as limiting.

ILLUSTRATIVE EMBODIMENT I

A terpolymer (87/032) of carbon monoxide, ethylene and propylene was produced by contacting the monomers in the presence of a catalyst composition formed from palladium acetate, the anion of trifluoroacetic acid and 1,2-bis[di(2-methoxyphenyl)phosphino]propane. The terpolymer had a melting point of 220° C. and a limiting viscosity number (LVN) of 1.8 measured at 60° C. in m-cresol in a standard capillary viscosity measuring device.

ILLUSTRATIVE EMBODIMENT II

The polyketone polymer of Illustrative Embodiment I was blended with various quantities of maleated, partially hydrogenated block copolymer available as KRATON®G 1901X Thermoplastic Rubber from Shell Chemical Company. The hydrogenated block copolymer was of the SES/SEBS type having styrene end blocks on the order of 28% by weight and a hydrogenated butadiene mid-block on the order of 72% by weight. Employing the residual unsaturation of the mid-block, 2% by weight of maleic anhydride had been graft polymerized on the partially hydrogenated block copolymer. The polymer has a specific gravity of 0.91 g/cc, a tensile strength of 5,000 psi and a solution viscosity (20% wt polymer in toluene) at 25° C. of 6,000 cps.

The blends were produced by dry mixing pellets of the polymeric components then melt blending the components in a 30mm co-rotating twin screw extruder having seven zones and a total L/D of 27/1. The melt temperature of the die was maintained at 260° C. and the barrel temperature was about 240° C. The blends were devolatilized under 40 in. Hg. vacuum at the zone adjacent the die. The residence time in the extruder was about 1 minute.

Samples of the blends were injection molded into ASTM test bars for the testing of notched izod and flex modulus by ASTM-256 and ASTM-790 methods respectively. The residence time in the injection molder was about 45 seconds with an exit temperature of about 270° C. The results of these tests on various concentrations of the KRATON®G 1901X in the polyketone polymer of Illustrative Embodiment I are shown in Table I together with the values obtained by testing of the unblended polyketone polymer.

TABLE I

| KRATON®G 1901X (% by weight) | Notched Izod-Room Temp. (ft lb/in) | Flex Modulus (psi) |
|---|---|---|
| 0 (Control) | 4.8 | 240,000 |
| 5 | 19.6 | 292,000 |
| 10 | 3.9 | — |
| 15 | 1.8 | — |
| 20 | 1.4 | — |

ILLUSTRATIVE EMBODIMENT III

The procedure of Illustrative Example II was employed except for a modified extruder die, to produce blend samples containing lower amounts of KRATON®G 1901X. The values obtained for these samples as well as for unblended polyketone polymer are shown in Table II.

TABLE II

| KRATON®G 1901X (% by weight) | Notched Izod (ft lb/in) Room Temp | Notched Izod (ft lb/in) −20° F. | Flex Modulus (psi) |
|---|---|---|---|
| 0 (Control) | 4.0 | 1.1 | 260,000 |
| 2 | 15.8 | 1.5 | 261,000 |
| 5 | 19.3 | 4.8 | 313,000 |
| 7 | 22.7 | 4.3 | 290,000 |

ILLUSTRATIVE EMBODIMENT IV

The procedure of Illustrative Embodiment II was employed except that samples of the blend were injection molded on an Engel (8 oz.) injection molder equipped with a 2.2/1 compression ratio 45mm screw. The cycle time for all samples was 30 seconds. About 0.5%wt Ethanox 330 was added to improve stability. The molded samples were immediately placed in a dry box and aged 24 hours prior to testing for notched izod impact strength and flex modulus.

Results of the tests on various concentrations of the KRATON®G 1901X in the polyketone polymer are shown in Table III together with results for the unblended polyketone.

TABLE III

| Sample KRATON®G 1901x | Flex Modulus (PSI) | Notched Izod (Ft Lb/In) R.T. | Notched Izod (Ft Lb/In) −20° F. |
|---|---|---|---|
| 0 (Control) | 260,000 | 4 | 1.1 |
| 2 | 260,000 | 16 | 1.5 |
| 5 | 313,000 | 19 | 4.8 |
| 7 | 290,000 | 23 | 4.3 |
| 10 | 247,000 | 4 | |
| 15 | 182,000 | 2 | |
| 20 | 131,000 | 1 | |

ILLUSTRATIVE EMBODIMENT V

The tensile properties of the polyketone and the polyketone/5% block copolymer blend of Illustrative Embodiment IV were measured after sample preparation and after oven aging for 2 weeks at 100° C. Results are reported in Table IV.

TABLE IV

| KRATON®G 1901X (% by weight) | Tensile Strength (psi) Break | Tensile Strength (psi) Yield | Elongation (%) Break | Elongation (%) Yield |
|---|---|---|---|---|
| 0 (Control) | 9100 | 8100 | 125 | 19.5 |
| 5% | 8700 | 8100 | 87 | 29.0 |
| After oven aging: | | | | |
| 0% (Control) | 8000 | 9300 | 26.1 | 16.3 |
| 5% | 7200 | 9500 | 29.5 | 14.6 |

ILLUSTRATIVE EMBODIMENT VI

The effect of polyketone LVN on impact strength for the maleated block copolymer blends was investigated using the procedures of Illustrative Embodiment IV for LVNs of 1.74, 1.57, and 1.31.

BRIEF DESCRIPTION OF THE DRAWINGS

The influence of the polyketone LVN on the impact strength of the polymer blends of the invention are shown in FIG. 1.

The tests for flex modulus and tensile strength are usually made in the flow direction for injection molded samples while impact strength is tested in a perpendicular direction to flow. Injection molded polymers typically exhibit anisotropy, however, the polyketone/maleated block copolymer blends of the present invention exhibited no evidence of directional effects on the measured properties. Further, these samples show an increase in flex modulus with increased block copolymer content which is an apparent anomaly for typical polymer/block copolymer blends.

Figure 1:
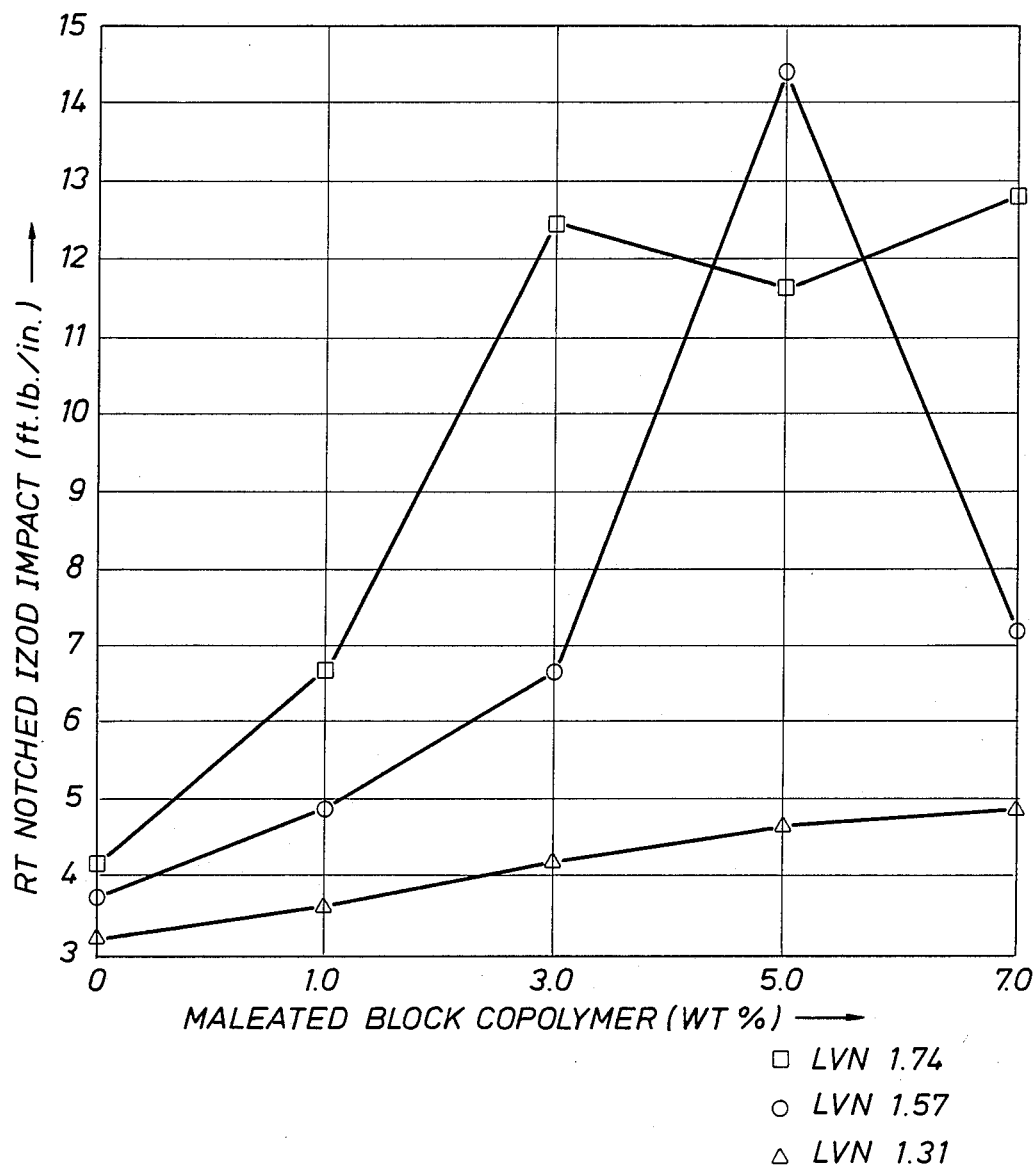

The preceding disclosure is intended to be illustrative and explanatory of the present invention and is not intended to limit the invention to specific commercial products or compounds used in the embodiments.

What is claimed is:

1. A polymer composition comprising a non-miscible blend of a linear alternating polymer of carbon monoxide and at least one ethylenically unsaturated hydrocarbon having less than 20 carbon atoms, with less than about 40% of a maleated, partially hydrogenated block copolymer having at least one A block of a predominantly polymerized vinyl aromatic hydrocarbon having a vinyl group attached directly to an aromatic ring and up to 12 carbon atoms inclusive, and at least one B block of at least 35% by mol of a polymerized conjugated alkadiene having up to 8 carbon atoms inclusive, the block copolymer having from 2 to 55% by weight of the A blocks and an average molecular weight between about 25,000 and 350,000, wherein most of the ethylenic unsaturation of the B blocks is hydrogenated and from about 0.02% to about 20% by weight of the block copolymer is moieties of maleic acid compounds that are grafted to the B blocks.

2. The composition of claim 1 wherein the linear alternating polymer is represented by the formula wherein D is a moiety of an ethylenically unsaturated hydrocarbon of at least 3 carbon atoms and the ratio of y:x is no more than about 0.5.

3. The composition of claim 2 wherein D is a moiety of polypropylene.

4. The composition of claim 2 wherein:
   each A block of the block copolymer is selected from a group consisting of styrene and α-methylstyrene, the average molecular weight of each A block being from about 5,000 to about 125,000;
   each B block of the block copolymer is selected from a group consisting of butadiene and isoprene, the average molecular weight of each B block being from about 10,000 to about 300,000;
   the A blocks being from about 2% by weight to about 55% by weight of the total block copolymer;
   the block copolymer has a residual B block unsaturation from about 0.5% to about 20% of the original unsaturation of the B block of said block copolymer; and
   the block copolymer has from about 0.02% by weight to about 10% by weight, based on total polymer, of moieties of a maleic acid compound grafted to the B block.

5. The composition of claim 4 wherein the block copolymer has at least two A blocks and at least one B block positioned between two A blocks.

6. The composition of claim 2, wherein the concentration of the block copolymer is between about 1 and about 20 percent by weight.

7. The composition of claim 2, wherein the concentration of the block copolymer is between about 2 and about 7 percent by weight and the linear alternating polymer has an LVN between about 1.8 and about 2.0.

* * * * *